United States Patent [19]

Lockwood et al.

[11] Patent Number: 5,013,872
[45] Date of Patent: May 7, 1991

[54] CABLE CLAMP

[75] Inventors: Alan C. Lockwood, Rosemead; Myron G. Bloom, Santa Ana, both of Calif.

[73] Assignee: Masco Building Products Corp., Taylor, Mich.

[21] Appl. No.: 351,351

[22] Filed: May 12, 1989

[51] Int. Cl.⁵ .............................................. H02G 3/08
[52] U.S. Cl. ................................................ 174/65 R
[58] Field of Search ...................... 174/65 R; 285/128; 220/3.2

[56]        References Cited
          U.S. PATENT DOCUMENTS

| Re. 23,270 | 10/1953 | Gillespie . | |
|---|---|---|---|
| 1,242,533 | 10/1917 | Duck | 174/64 |
| 1,277,876 | 9/1918 | Detwiler | 24/129 R |
| 1,288,902 | 12/1918 | Hyatt et al. | 285/194 |
| 1,295,249 | 2/1919 | Wulkan | 285/194 |
| 1,667,814 | 5/1928 | Morgenstern et al. | 285/129 |
| 1,708,827 | 4/1929 | Black et al. | 285/129 |
| 1,760,663 | 5/1930 | Rosenfield | 220/3.2 X |
| 1,772,241 | 8/1930 | Calderwood | 220/3.2 X |
| 1,822,128 | 9/1931 | Clayton | 174/65 R |
| 2,391,761 | 12/1945 | Winn | 285/382 |
| 2,457,235 | 12/1948 | Hoehn | 285/159 |
| 2,458,409 | 1/1949 | Paige | 285/162 |
| 2,556,977 | 6/1951 | Paige | 285/128 |
| 2,564,341 | 8/1951 | Paige | 285/162 |
| 2,706,647 | 4/1955 | Gillespie | 285/162 |
| 3,084,958 | 4/1963 | Appleton | 285/189 |
| 3,344,502 | 10/1967 | Maier | 174/65 R X |
| 3,410,582 | 11/1968 | Appleton | 285/128 |
| 3,476,411 | 11/1969 | Herbert et al. | 285/192 |
| 3,676,571 | 7/1972 | Rubinstein | 174/65 R |
| 3,783,176 | 1/1974 | Lund et al. | 174/65 R |
| 4,018,982 | 4/1977 | Svekis | 174/65 R |
| 4,082,915 | 4/1978 | Silver | 174/51 |
| 4,306,109 | 12/1981 | Nattel | 174/51 |
| 4,459,429 | 7/1984 | Docimo | 174/65 R |

FOREIGN PATENT DOCUMENTS 460762 11/1949 Canada ............................ 174/65 R Primary Examiner—Leo P. Picard
Assistant Examiner—David A. Tone
Attorney, Agent, or Firm—Edgar A. Zarins; Malcolm L. Sutherland

[57]            ABSTRACT

A cable clamp for use in an electrical box or the like for locating, holding and grounding cables fed into the box and through the clamp. The cable clamp is mounted within the electrical box adjacent the knock-out openings using a single fastener to retain one or two sheathed cables. The cables are clamped between walls of the clamp which includes an end abutment wall having a pair of apertures through which the conductor wires are fed. The abutment wall positionally locates the sheath of the cable. The clamping walls are brought together to retain the cable as the single fastener is tightened. The clamping walls include inner ribs which receive maximum clamping force via a stiffener flange and a small bearing surface to securely engage and position the cable. The cable clamp is integrally formed from a single piece of material, preferably steel.

15 Claims, 2 Drawing Sheets

CABLE CLAMP

BACKGROUND OF THE INVENTION

I. Field of the Invention

This invention relates to electrical boxes and the like for receiving and retaining cables fed therein and, in particular, to a single piece clamp mountable within such boxes for independently securing the ends of the cable within the box.

II. Description of the Prior Art

Electrical junction boxes are widely utilized to join a plurality of cables or to connect cables to fixtures and the like. Conventional boxes may include knockouts formed in the wall of the box so that the cable can pass into the box. Clamping means are usually provided to secure the ends of electrical conductors within the openings such that the connections made within the box will be grounded thereto and prevented from disconnection therefrom. Such clamping means take on many different forms but for the most part retain the ends of the cable by clamping the cable against one or more walls of the junction box. The wall of the box or the clamp member may include protrusions in an attempt to more securely clamp down on the sheathed cable. The clamping strength of such prior known devices is limited by the cooperation of the clamping plate with the wall of the box. Since many boxes include smooth walls, the inherent weakness of such devices resides in the necessary cooperation.

Some of the prior known clamping devices utilize multiple fasteners to ensure secure clamping or fasteners which are deployed at an angle to the junction box to create the clamping force. Such fastening systems require special care to ensure an even clamping force which will not eventually strip the fasteners loosening the cable connection. These prior known clamping systems also require much more time to install.

SUMMARY OF THE PRESENT INVENTION

The present invention overcomes the disadvantages of the prior known electrical box clamping systems by providing a fully integrated cable clamp mountable within the box for securing the ends of a cable independently of the box structure.

The cable clamp embodying the present invention generally comprises an integral shell having a pair of opposingly disposed clamping walls between which the electrical cables and the like are clampingly secured and an end wall connecting the clamping walls. The end wall preferably includes a pair of apertures for receiving the conductor wires of the cable while abutting the ends of the cable sheath. The clamping walls include aligned apertures through which a fastener is fed to mount the clamp within the box and compress the clamping walls into engagement with the cable. At least one of the clamping walls is provided with semi-cylindrical seats to receive the cable. Preferably both clamping walls include protrusions designed to engage and secure the sheathed cable therebetween. The interaction of the protrusions with the cable and the clamp with the walls of the junction box ensure intimate contact between the cable, clamp and the box housing. The clamp of the present invention is preferably manufactured as an integral component from a single piece of steel.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
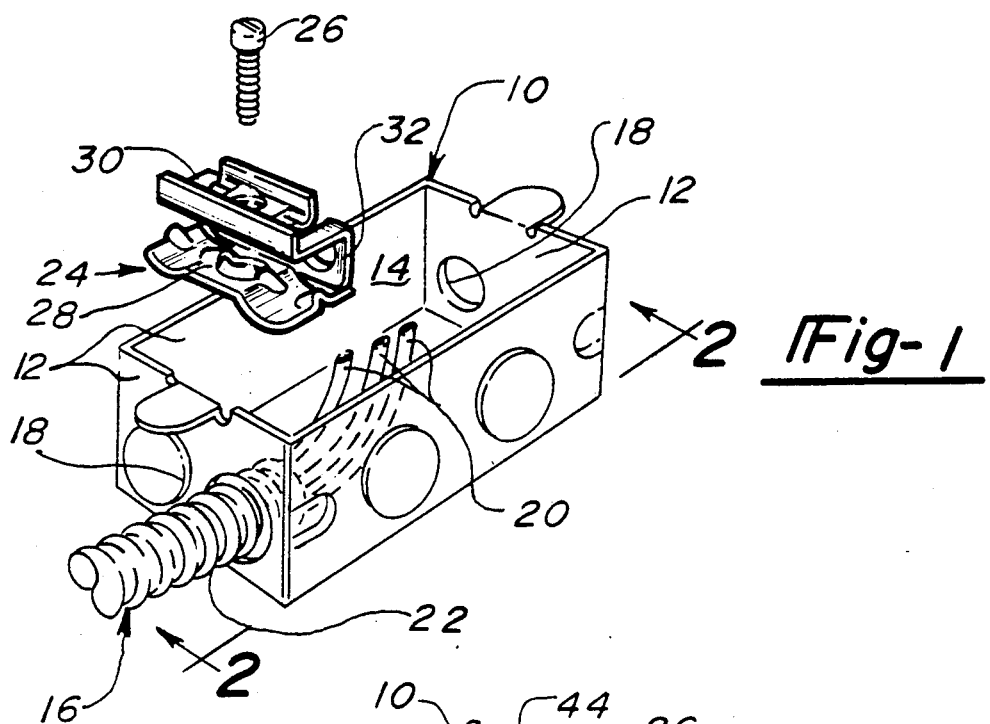
FIGURE 1 is an exploded perspective view of an electrical connection box and a cable clamp embodying the present invention.
Figure 2:
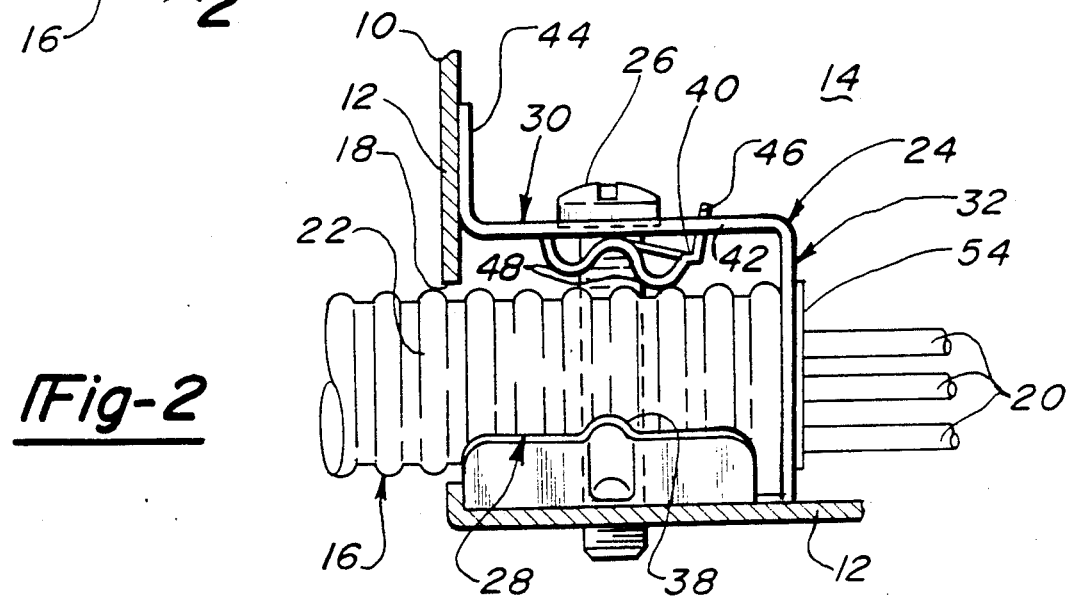
FIG. 2 is a partial cross-sectional perspective of the cable clamp of the present invention mounted within the electrical connection box taken along lines 2—2 of FIG. 1.
Figure 3:
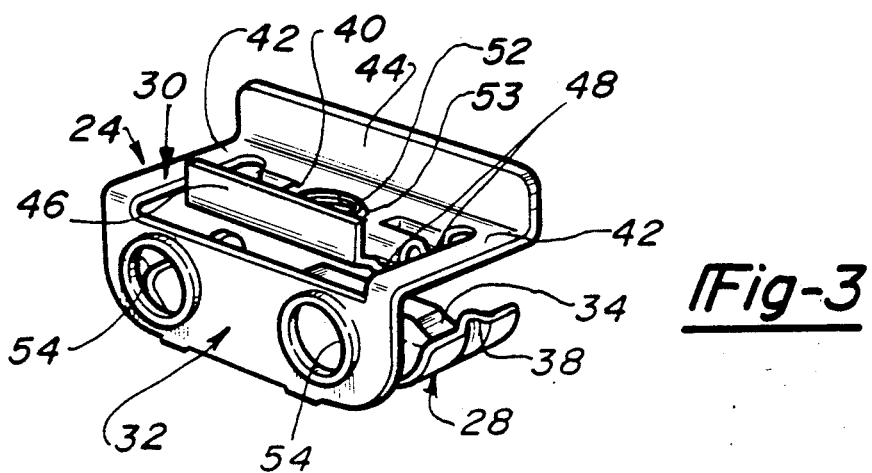
FIG. 3 is a first elevated perspective of the cable clamp embodying the present invention.
Figure 4:
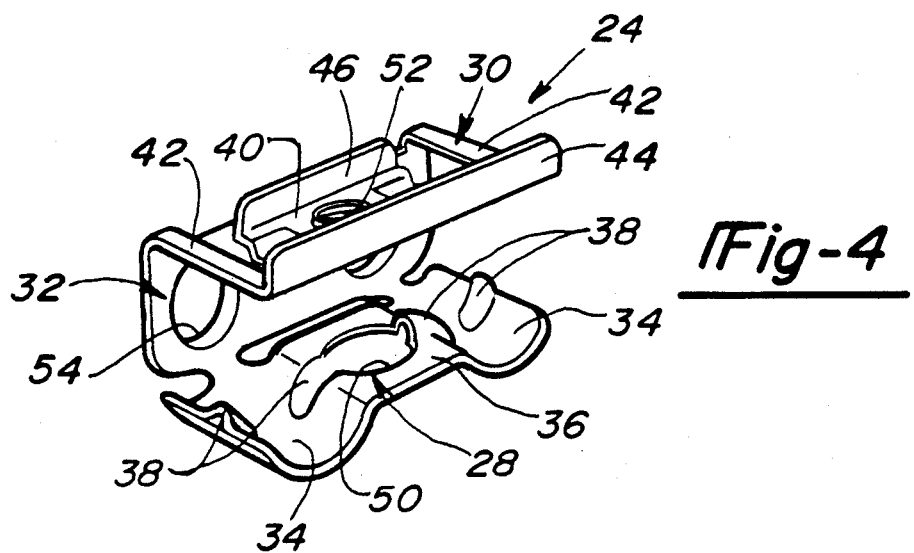
FIG. 4 is a second elevated perspective of the cable clamp of the present invention.
Figure 5:
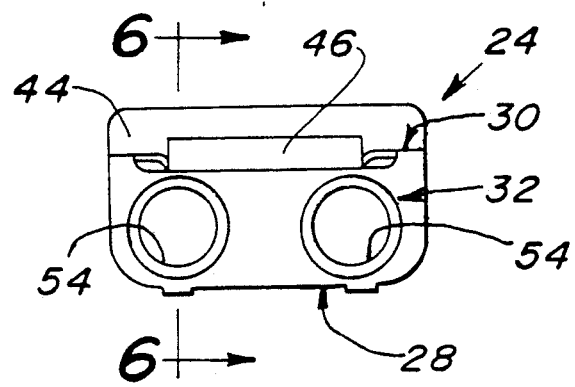
FIG. 5 is an end plan view of the cable clamp embodying the invention.
Figure 6:
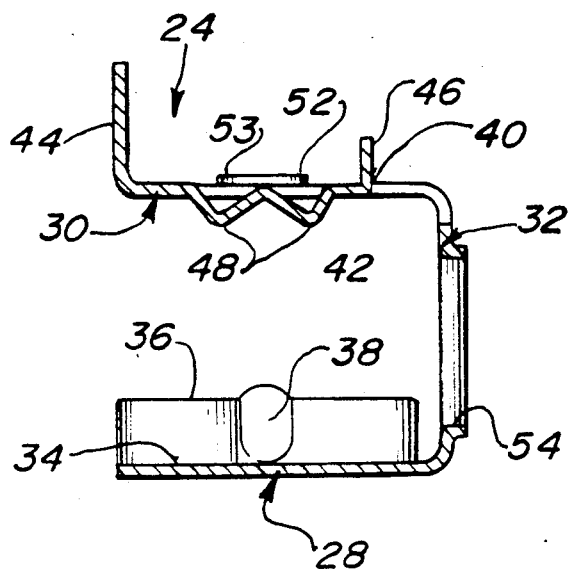
FIG. 6 is a cross-sectional view of the cable clamp taken along lines 6—6 of FIG. 5.

Referring first to FIGS. 1 and 2 there is shown an electrical wiring or junction box 10 having walls 12 defining a housing 14. The box 10 is designed to receive one or more electrical cables 16 for connection to other cables, a light fixture or other electrical devices (not shown). The cable 16 is fed into the housing 14 of the box 10 through an opening 18 formed in the wall 12 of the box 10 and preferably includes a plurality of conductor wires 20 and sheathing 22. A corrugated metal sheathing having a plurality of helical ribs is shown in the drawing although the cable may be provided with a vinyl sheathing such as used in non-metallic cables. In order to prevent the cable 16 from being inadvertently withdrawn from the box 10 or the electrical connection made within the box 10 from being disconnected as well as to maintain grounding continuity, the end of the cable 16 is secured within the housing 14 by a cable clamp 24 embodying the present invention. The cable clamp 24 is preferably secured within the box 10 by a fastener 26 as will be subsequently described.

Referring now to FIGS. 2 through 6, the clamp 24 generally includes a lower clamping wall 28 and an upper clamping wall 30 disposed in spaced apart, substantially parallel relation to each other. The clamping walls 28 and 30 are connected to each other and maintained in spaced apart relation by an end abutment wall 32 disposed substantially perpendicular to the clamping walls 28 and 30 thereby forming the integral clamp member 24. In a preferred embodiment, the clamp 24 is stamped as a single, integral component of steel. Although in a preferred embodiment the clamping walls 28 and 30 have specific features it should be understood that such features may be interchanged to provide the necessary clamping strength.

Lower clamping wall 28 includes a pair of semi-cylindrical seats 34 adapted to positionally locate the cable or cables 16 within the clamp 24. The seats 34 are separated by a raised platform 36 which maintains separation of the cables 16. Formed in each of the seats 34 are a plurality of rib-like protrusions 38 extending upwardly from the seat 34. A single protrusion 38 may extend laterally across the seat 34 or, as shown in the drawings, matched pairs of protrusions 38 may be formed in each seat 34. The protrusions 38 are designed in enhance the clamping strength of the present invention by pressing into the sheath 22 of the cable 16 to secure the cable. In the case of corrugated or wrapped sheathing the protrusions 38 may be positioned between the ribs of the sheath 22 to enhance the clamping strength.

Upper clamping wall 30 includes a clamping flange 40 extending from a surrounding frame 42 to form a flap-like member which can bend independently of the upper clamping wall 30 as the clamping wall 30 bends relative to end wall 32. Extending upwardly from the upper clamping wall 30 is an abutment flange 44 which, as shown in FIG. 2, engages a wall 12 of the connection box 10 to provide support for the free end of the upper clamping wall 30 of the clamp 24 while closing off any exposed portion of the knockout opening 18. The clamping flange 40 extends inwardly away from the abutment flange 44 and includes a stiffener flange 46 formed at the free end thereof substantially perpendicular to the clamping flange 40. Formed along both sides of the clamping flange 40 in order to engage the two cables 16 positioned within the clamp 24 are retaining ribs 48. In a preferred embodiment, each side of the clamping flange 40 includes a pair of retaining ribs 48 formed at an angle so as to align with the helical ribs of the corrugated sheath 22 of the cable 16. Accordingly, the retaining ribs 48 will be received between the ribs of the cable sheath 22 as the clamp 24 is compressed into engagement forming a thread-like engagement. In the case of Romex-type cables, the ribs 48 will press into the vinyl or metal sheath enhancing engagement.

The clamping walls 28 and 30 include axially aligned apertures for receiving the fastener 26. The lower clamping wall 28 includes an aperture 50 formed in the platform 36 between the seats 34. The upper clamping wall 30 includes an aperture 52 centrally located in the clamping flange 40. The fastener 26 therefore will extend between the cables 16 positioned within the clamp 24. In a preferred embodiment, the aperture 52 is provided with a raised extruded lip 53 to decrease the area of contact between the fastener 26 and the clamping flange 40. As a result, the required pressure to clamp against the cables 16 could be obtained with a limited 35 in.-lbs. of torque applied to the fastener 26.

End abutment wall 32 extending between the clamping walls 28 and 30 includes a pair of apertures 54 through which the cables 16 extend as shown in FIG. 2. The apertures 54 are axially aligned with the seats 34 of the lower clamping wall 28 such that the cable 16 positioned in seat 34 will align with aperture 54. The apertures 54 are configured to allow the conductor wires 20 to extend into the housing 14 while forming a stop for the cable sheath 22. The abutment wall 32 thereby locates the cable 16 within the clamp 24 while preventing it from being pulled too far into the box 10.

Referring to FIG. 2, the cable clamp 24 of the present invention provides secure retainment of the cable 16 capable of holding a static load of 150 pounds with only 35 in.-lbs. of torque on the fastener 26 while resisting loosening and assuring continuous intimate contact between the connection box 10 and the sheath 22 of the cable 16 so that the electrical resistance therebetween is within the required limits. The cable clamp 24 is positioned within the housing 14 of the connection box 10 such that the abutment flange 44 is in contact with the wall 12 through which the cable 16 will be fed and the lower clamping wall 28 is in contact with the wall 12 to which the clamp 24 is to be secured. Once the clamp 24 is secured within the box 10 using the fastener 26, the cable or cables 16 may be fed into the box 10 through opening 18 and the clamp 24. Since the seats 34 and apertures 54 will be aligned with the respective opening 18 in the wall 12 of the box 10, as the cable 16 is fed into the housing 14 it will be positioned within the respective seat 34 and the conductor wires 20 will extend through the respective aperture 54. The conductor wires 20 of the cable 16 should be pulled through the aperture 54 until the sheath 22 abuts against the wall 32. With the cables 16 properly positioned, the fastener 26 can be rotated to clampingly compress the clamping walls 28 and 30 against the cable 16. As the fastener 26 is rotated, upper clamping wall 30 and the clamping flange 40 will be bent downwardly against the cable 16. The flush engagement of the abutment flange 44 will maintain parallel alignment of the entire upper clamping wall 30. Stiffener flange 46 of the clamping flange 40 transmits the downward pressure from the fastener 26 to the ribs 48 ensuring that the downward force is exerted at the ribs 48 as the clamping flange 40 bends independently of the upper clamping wall 30. As the clamping compression is increased, the upper wall 30 will continue to move downwardly pressing the ribs 48 into the cable sheath 22 and, at the same time, causing the protrusions 38 associated with the seats 34 to grip into the sheath 22. With the sheath of the cable 16 secured, the conductor wires 20 can be wired as necessary. Thus, the cable clamp 24 of the present invention provides improved location, retainment and grounding of one or two sheathed cables 16. The clamp 24 is held in place and tightened by a single fastener and can be economically fabricated as an integral component.

The foregoing detailed description has been given for clearness of understanding only and no unnecessary limitations should be understood therefrom as some modifications will be obvious to those skilled in the art without departing from the scope and spirit of the appended claims.

We claim:

1. A cable clamp for clampingly retaining an end of an electrical cable within an electrical connection box said clamp mountable within the box adjacent an opening in a wall of the box for receiving the cable, said cable clamp comprising:

a pair of opposing clamping walls in spaced apart relation for selectively retaining the cable therebetween for retention within the connection box, said clamping walls including an upper clamping wall including a bendable clamping flange forming a portion thereof engageable with the cable, said clamping flange connected at a first end to said upper clamping wall and including a stiffener flange formed at a second free end of said clamping flange substantially perpendicular thereto;

an abutment wall integrally formed with and extending between said clamping walls, said abutment wall having at least one aperture through which the cable may extend; and fastening means for mounting said clamp within the box for clampingly compressing said clamping walls against the electrical cable thereby securing the cable within the connection box, said fastening means being adapted to compressing said clamping flange against the electrical cable to retain the cable within said clamp.

2. The cable clamp as defined in claim 1 wherein said clamping flange includes at least one retaining rib engageable with the cable upon clamping compression of said clamping walls.

3. The cable clamp as defined in claim 2 wherein said at least one rib forms a partial thread threadably engageable with a corrugated sheath of the cable.

4. The cable clamp as defined in claim 22 wherein said abutment wall includes a pair of apertures for receiving the cable therethrough, said apertures configured to allow the conductor wires of the cable to pass through said apertures into the connection box while any cable sheathing engages said abutment wall.

5. The cable clamp as defined in claim 4 wherein at least one of said clamping walls includes a pair of semi-cylindrical seats axially aligned with said apertures of said abutment wall to positionally retain the cable in alignment with said respective aperture.

6. The cable clamp as defined in claim 5 wherein said seats include at least one retaining protrusion, said at least one protrusion engageable with the cable upon clamping compression of said clamping walls to secure the cable within said seat.

7. The cable clamp as defined in claim 5 wherein one of said clamping walls includes said semi-cylindrical seats and the other of said clamping walls includes said clamping flange, said clamping flange bendable relative to said clamping wall upon tightening of said fastening means to clampingly compress the cable against said semi-cylindrical seats.

8. The cable clamp as defined in claim 7 wherein said clamping walls include axially aligned apertures for receiving said fastening means, said means extending through said apertures to secure said clamp within the electrical box, said clamping flange being bent towards said seats upon tightening of said fastening means.

9. In an electrical connection box having walls forming a housing and at least one opening to receive an electrical cable therethrough into the housing, the improvement comprising:
an integrated clamp mounted within said housing adjacent said at least one opening for clampingly securing the electrical cable within said box, said clamp including a pair of opposing clamping walls, an end abutment wall integrally formed with said clamping walls and fastening means extending between said clamping walls to clampingly compress aid clamping walls against the electrical cable thereby securing the cable within said housing, said clamping walls including an upper clamping wall including a bendable clamping flange connected at a first end to said upper clamping wall and having a stiffener flange formed substantially perpendicular thereto at a second free end of said clamping flange said fastening means being adapted to clampingly compress said clamping flange against the cable.

10. The improved electrical box as defined in claim 9 wherein said abutment wall includes at least one aperture for receiving said electrical cable.

11. The improved electrical box as defined in claim 10 wherein an other of said clamping walls includes at least one semi-cylindrical seat axially aligned with said at least one aperture of said abutment wall to positionally retain the cable extending into said housing through said clamp.

12. The improved electrical box as defined in claim 11 wherein said at least one seat includes a retaining protrusion engageable with the cable upon clamping compression of said clamping walls, said retaining protrusion engaging a protective sheath of the cable.

13. The improved electrical box as defined in claim 11 wherein said clamping flange includes at least one retaining rib engageable with the cable upon clamping compression of said clamping walls.

14. The improved electrical box as defined in claim 13 wherein said clamping walls include axially aligned apertures for receiving said fastening means, said fastening means extending through said aligned apertures and into an aperture in said housing for securing said clamp within said electrical box, said fastening means bending said clamping flange into clamping compression with the cable.

15. An electrical connection box for electrical cable comprising:
a housing having a plurality of walls, at least one of said walls of said housing including at least one opening configured to receive the electrical cable therethrough into the interior of said housing;
a cable clamp removably mounted within said housing adjacent said at least one opening such that the cable may be extended through said cable clamp, said cable clamp including a pair of opposing clamping walls formed in spaced apart relation and an abutment wall integrally formed with said clamping walls substantially perpendicular thereto; and
fastening means for clampingly compressing said clamping walls against opposite sides of the electrical cable thereby securing the cable within said box, said fastening means securing said cable clamp within said housing;
said abutment wall including a pair of apertures for receiving the cable therethrough, said clamping walls including a lower clamping wall adjacent a wall of said housing including a pair of semi-cylindrical seats axially aligned with said apertures to positionally retain the cable and an upper clamping wall spaced apart from said lower wall and said wall of said housing, said upper clamping wall including an integral abutment flange and an integral bendable clamping flange connected at a first end to said upper clamping wall and having a stiffener flange formed substantially perpendicular thereto at a free second end of said clamping flange, said clamping flange bendable into clamping compression with the cable upon tightening of said fastening means.

* * * * *